(12) United States Patent
Tsukitani et al.

(10) Patent No.: US 9,872,005 B2
(45) Date of Patent: Jan. 16, 2018

(54) MOVING IMAGE REPRODUCING APPARATUS

(71) Applicant: MITSUBISHI ELECTRIC CORPORATION, Tokyo (JP)

(72) Inventors: Takayuki Tsukitani, Tokyo (JP); Kyoichi Masutomi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/107,124

(22) PCT Filed: Jan. 21, 2014

(86) PCT No.: PCT/JP2014/051065
§ 371 (c)(1),
(2) Date: Jun. 22, 2016

(87) PCT Pub. No.: WO2015/111131
PCT Pub. Date: Jul. 30, 2015

(65) Prior Publication Data
US 2017/0048506 A1    Feb. 16, 2017

(51) Int. Cl.
*G11B 27/00* (2006.01)
*H04N 9/76* (2006.01)
(Continued)

(52) U.S. Cl.
CPC .............. *H04N 9/76* (2013.01); *G06T 11/40* (2013.01); *G11B 27/031* (2013.01); *H04N 5/265* (2013.01); *H04N 9/87* (2013.01)

(58) Field of Classification Search
CPC . H04N 9/76; H04N 5/265; H04N 9/87; G11B 27/031; G06T 11/40
See application file for complete search history.

(56) References Cited

U.S. PATENT DOCUMENTS 5,343,252 A * 8/1994 Dadourian ............... H04N 9/75
                                                                         348/586
5,467,442 A   11/1995 Tsubota et al.
(Continued)

FOREIGN PATENT DOCUMENTS

JP    6-181579 A    6/1994
JP    7-210142 A    8/1995
(Continued)

OTHER PUBLICATIONS

Office Action dated Feb. 4, 2017 in corresponding Chinese Application No. 201480073439.5 with a partial English Translation.

*Primary Examiner* — Mishawn Hunter
(74) *Attorney, Agent, or Firm* — Birch, Stewart, Kolasch & Birch, LLP

(57) ABSTRACT

A moving image reproducing apparatus and a moving image controller are provided. The moving image reproducing apparatus includes a moving image data storer which stores moving image data including a target object having a transparency, at least one of a shade and a gloss on the target object, and a background image. The moving image controller fetches the moving image data from the moving image data storer, disposes an area having a color whose setting is changeable behind the moving image data, synthesizes the moving image data and the area, and sets the color of the area corresponding to the transparency as a color of the target object.

2 Claims, 4 Drawing Sheets

(51) Int. Cl.
  *H04N 5/265* (2006.01)
  *G06T 11/40* (2006.01)
  *G11B 27/031* (2006.01)
  *H04N 9/87* (2006.01)

(56) References Cited

U.S. PATENT DOCUMENTS

| | | | |
|---|---|---|---|
| 6,134,345 A | 10/2000 | Berman et al. | |
| 6,556,775 B1* | 4/2003 | Shimada | H04N 5/272 |
| | | | 348/E5.058 |
| 8,705,855 B2* | 4/2014 | Tsukada | H04N 1/62 |
| | | | 382/167 |
| 2014/0181273 A1* | 6/2014 | Kondo | H04L 65/60 |
| | | | 709/219 |
| 2014/0228120 A1* | 8/2014 | Hong | A63F 13/80 |
| | | | 463/35 |

FOREIGN PATENT DOCUMENTS

| | | |
|---|---|---|
| JP | 11-224321 A | 6/1999 |
| JP | 2002-92633 A | 3/2002 |
| JP | 2002-524003 A | 7/2002 |
| JP | 2003-196675 A | 7/2003 |

* cited by examiner

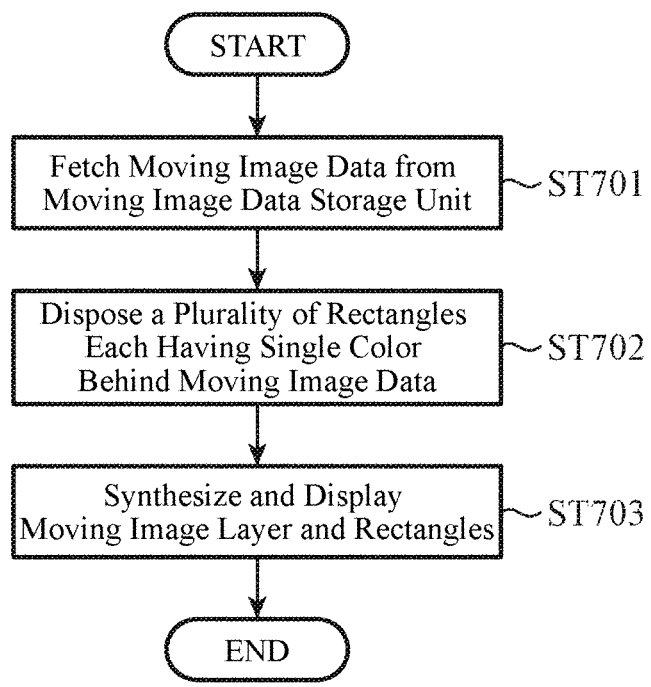

MOVING IMAGE REPRODUCING APPARATUS

TECHNICAL FIELD

This invention relates to a moving image reproducing apparatus which reproduces moving image data adjusted to a plurality of color variations from a single piece of moving image data.

BACKGROUND ART

When moving image data is generated in which objects having a same shape and a plurality of color variations such as an automobile, a home electric appliance, or clothing appear, in a case where it is desired to prepare moving image data having a same content for all of the color variations, it is necessary to generate the same number of moving image data to the color variations in advance.

However, in this case, the following problems arise: a file capacity is consumed in proportion to the number of color variations; and it requires additional processing to generate moving image data every time a color variation is newly added.

As a solution to these problems, it is conceivable to change only the color of a target object in a single piece of moving image data at the time of reproducing a moving image in correspondence to a plurality of color variations. As a method for generating a plurality of images from a single piece of image data, for example, Patent Document 1 discloses a method in which the part of a foreground image indicated by three-dimensional indication means is made transparent, and the image is synthesized with a background image. In addition, Patent document 2 discloses a method in which, in the case where a target object casts its shadow on the background image, the background image is changed with retaining the shadow.

PRIOR ART DOCUMENTS

Patent Documents

Patent Document 1: Japanese Patent Application Laid-open No. JPH11-224321
Patent Document 2: Japanese Translation of PCT International Application Publication No. JP2002-524003

SUMMARY OF THE INVENTION

Problem to be Solved by the Invention

However, in Patent Document 1, synthesis which focuses on a target object in a moving image data is not performed, and hence there has been a problem that it is not possible to change only the color of the target object. In addition, in Patent document 2, though a target object is focused on, the shadow cast on the background from the target object is targeted so that, similarly to Patent Document 1, there has been a problem that it is not possible to change only the color of the target object.

The present invention has been made for solving the above problems, and an object thereof is to provide a moving image reproducing apparatus capable of generating moving image data from a single piece of moving image data at the time of reproduction, in which a target object displayed in the moving image data is adjusted to a plurality of color variations.

Means for Solving the Problems

The moving image reproducing apparatus according to the present invention has: a moving image data storer which stores moving image data including a target object having a transparency, at least one of a shade and a gloss on the target object, and a background image; and a moving image controller which fetches the moving image data from the moving image data storer, disposes an area having a color whose setting is changeable behind the moving image data, synthesizes the moving image data and the area, and sets the color of the area corresponding to the transparency as a color of the target object.

Effect of the Invention

According to the present invention, it is possible to generate a moving image data for a target object displayed in the moving image data and adjusted to a plurality of color variations from a single piece of moving image data at the time of reproduction.

BRIEF DESCRIPTION OF THE DRAWINGS

FIG. 7 is a flowchart of an operation of the moving image reproducing apparatus according to Embodiment 3 of the present invention.

BEST MODE FOR CARRYING OUT THE INVENTION

In the following, some embodiments of the present invention will be described in detail with reference to the accompanying drawings.

Embodiment 1

Figure 1:
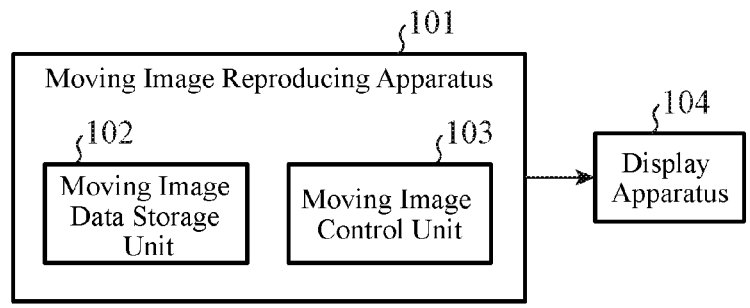
FIG. 1 is a configuration diagram of a moving image reproducing apparatus according to Embodiment 1 of the present invention.

FIG. 1 is a configuration diagram of a moving image reproducing apparatus 101 according to Embodiment 1 of the present invention.

As shown in FIG. 1, the moving image reproducing apparatus 101 includes a moving image data storage unit 102 and a moving image control unit 103.

The moving image data storage unit 102 stores moving image data serving as a source for a moving image to be reproduced. Note that, in this Embodiment 1, in the moving image data, each of a target object 201, and a shade part and a gloss part on the target object 201 has a single transparency. In this Embodiment 1, for example, the transparency is provided such that the target object 201 is transparent, at least one of the shade and the gloss on the target object is semitransparent, and a background image 203 is opaque, and the target object 201, at least one of the shade and the gloss on the target object 201, and the background image 203 are integrated and stored (this will be described later with reference to FIG. 2).

The moving image control unit 103 fetches the moving image data from the moving image data storage unit 102, disposes an area having a color whose setting is changeable behind the moving image data, synthesizes the moving image data and the area, sets the color of the area corresponding to the transparency as the color of the target object 201, and displays them on a display apparatus 104.

Figure 2:
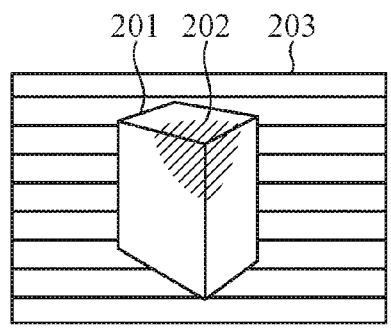
FIG. 2 is a view showing an example of moving image data stored in a moving image data storage unit.

FIG. 2 is a view showing an example of the moving image data stored in the moving image data storage unit 102.

Note that the moving image data stored in the moving image data storage unit 102 is the set of frames constituting the moving image, and FIG. 2 is an example of the frame.

In the moving image data storage unit 102, any moving image data can be stored as long as the moving image has an object serving as the target of color change. In this explanation, as shown in FIG. 2, Embodiment 1 will be described by using, as an example, the moving image data in which one rectangular parallelepiped is present as the target object 201.

In FIG. 2, the rectangular parallelepiped expressed in white is the target object 201, and this part is actually transparent.

In addition, in the drawing of the target object 201, a part in the vicinity of the apex on this side is a shade/gloss part 202 which represents at least one of the shade and the gloss on the target object 201, and this part is actually semitransparent.

Further, a part represented with horizontal stripes is the background image 203, and this part is completely opaque.

When the image is a still image instead of a moving image, it is sufficient to dispose a layer and a background image each having the same contour as that of the target object 201 and a single color behind. However, in the case of a moving image, when the same configuration is employed, it is necessary to have additional moving image data having only the contour besides the original moving image data, and since two pieces of the moving image data are to be reproduced simultaneously, the size of the moving image data and a processing load at the time of reproduction are increased. To cope with this, in Embodiment 1 of the present invention, by integrating the target object 201, the shade/gloss part 202, and the background image 203 into one moving image, the problem of size increase of the moving image data and the processing load at the time of the reproduction is avoided.

Next, an operation of the moving image reproducing apparatus 101 according to Embodiment 1 of the present invention is explained.

Figure 3:
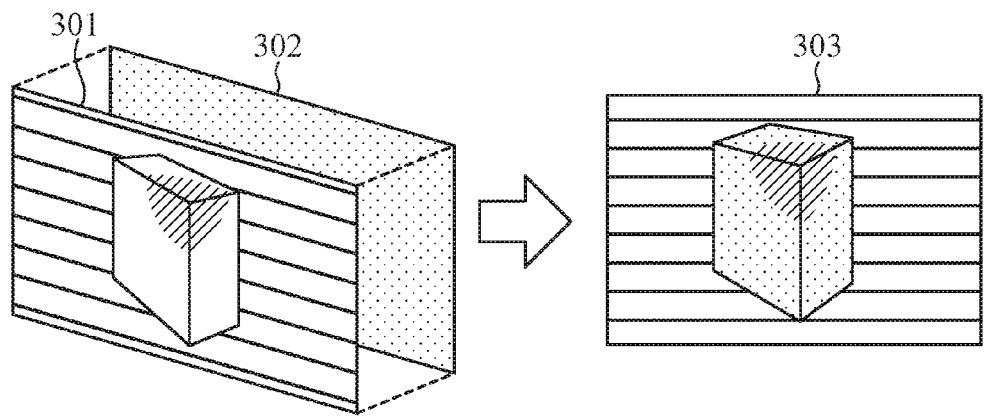
FIG. 3 is an overview diagram of an animation generation method in Embodiment 1 of the present invention.

FIG. 3 is an overview diagram of an animation generation method in Embodiment 1 of the present invention.

Figure 4:
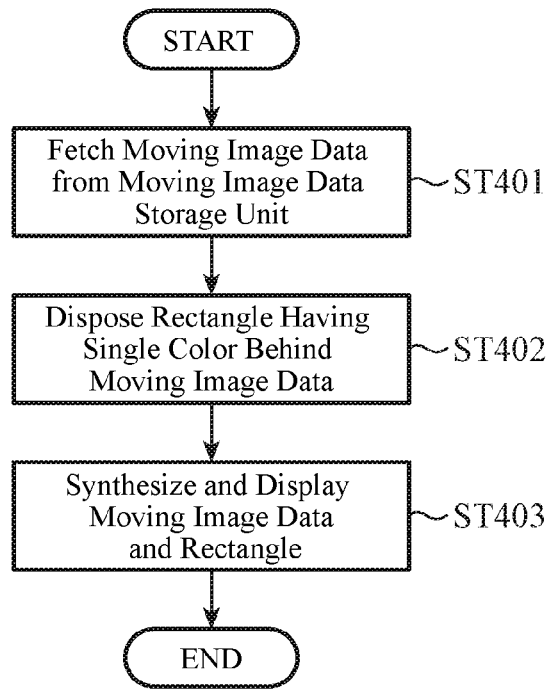
FIG. 4 is a flowchart of an operation of the moving image reproducing apparatus according to Embodiment 1 of the present invention.

FIG. 4 is a flowchart of the operation of the moving image reproducing apparatus 101 according to Embodiment 1 of the present invention.

The moving image control unit 103 fetches one piece of moving image data from the moving image data storage unit 102, and disposes the moving image data as a moving image layer 301 (Step ST401).

The moving image control unit 103 disposes a rectangle 302 behind the moving image data fetched in Step ST401, in which the rectangle 302 has the same size as that of the moving image layer 301, and has a single color which can be changed freely by the moving image control unit 103 (Step ST402). Note that, though the rectangle 302 has a dot pattern for the sake of clarity in FIG. 3, the rectangle 302 is actually colored in a single color without any pattern.

The moving image control unit 103 synthesizes the moving image data and the rectangle 302 and displays them on a display apparatus 104 at the time of reproduction of the moving image (Step S1403). The generation result 303 in FIG. 3 shows a result of synthesis of the moving image data and the rectangle 302 by the moving image control unit 103.

In the generation result 303, the background image 203 (see FIG. 2) is reflected in the background part without being altered, and the part of the target object 201 becomes the color of the rectangle 302. Further, since the shade/gloss part 202 is semitransparent, the shade/gloss part 202 has an appearance as synthesized with the color of the rectangle 302.

Thus, according to Embodiment 1, the following constituents are provided: a moving image data storage unit 102 which stores the moving image data including the target object 201 having the transparency, at least one of the shade and the gloss on the target object 201 (the shade/gloss part 202), and the background image; and a moving image control unit 103 which fetches the moving image data from the moving image data storage unit 102, disposes an area having a color whose setting is changeable (the rectangle 302) behind the moving image data, synthesizes the moving image data and the area, and sets the color of the area corresponding to the transparency as the color of the target object 201. As a result, it is possible to generate and reproduce a moving image adjusted to the color variation of any color from one piece of moving image data at the time of reproduction of the moving image for the target object 201 displayed in the moving image data. In addition, with this, even when the number of color variations is increased, the file size required to retain the moving image data is not increased, and an operation which occurs when the color variation is newly added can be made extremely light.

Embodiment 2

Though in Embodiment 1, the moving image layer 301 is not changed, in Embodiment 2, a description will be given in which the color of the shade/gloss part 202 in the moving image layer 301 is changed.

The configuration of the moving image reproducing apparatus 101 is the same as that described in FIG. 1 in Embodiment 1, and hence the repeated description thereof will be omitted.

In the following, an operation of the moving image reproducing apparatus 101 according to Embodiment 2 of the present invention is explained.

Figure 5:
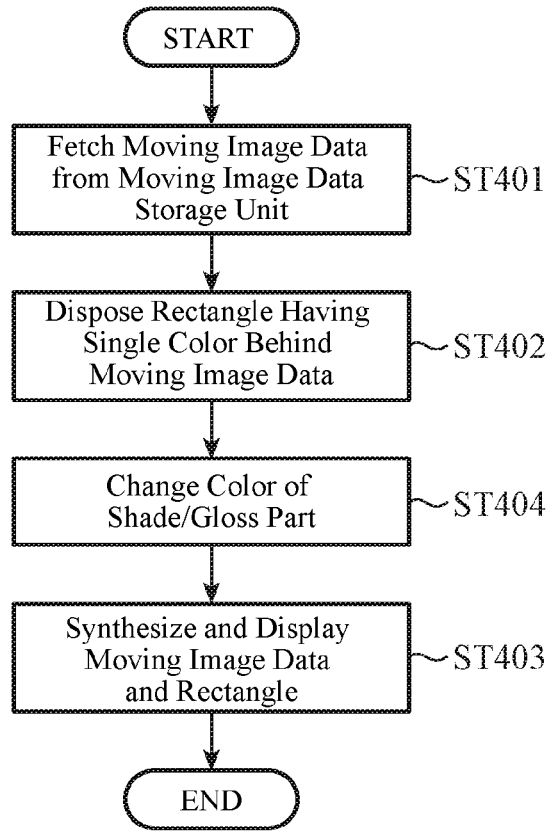
FIG. 5 is a flowchart of an operation of the moving image reproducing apparatus according to Embodiment 2 of the present invention.

FIG. 5 is a flowchart of the operation of the moving image reproducing apparatus 101 according to Embodiment 2 of the present invention.

Note that Steps ST401, ST402, and ST403 in FIG. 5 are the same as Steps ST401, ST402, and ST403 described in FIG. 4, and hence the repeated description thereof will be omitted, and the operation different from the operation in FIG. 4 will be described.

As described with reference to FIG. 2 in Embodiment 1, in Embodiment 2 as well, in the moving image layer 301, the following transparencies are assumed: the target object 201 is completely transparent; the shade/gloss part 202 is semitransparent; and the background image 203 is completely opaque.

After the rectangle 302 is disposed behind the moving image data in Step ST402 in which the rectangle 302 has the same size as that of the moving image layer 301 and has a single color which can be changed freely by the moving image control unit 103, the moving image control unit 103 changes only the color of the shade/gloss part 202 arbitrarily (Step ST404) just before synthesizing the moving image layer 301 and the rectangle 302 in Step ST403.

Thereafter, the moving image control unit 103 synthesizes and displays the moving image layer 301 and the rectangle 302 (Step ST403), and ends processing.

Thus, with the process in Step ST404, it is possible to change only the color of the part which is not completely transparent or completely opaque to give an effect in which the color of a light source emitted to the target object is changed. Note that the process in Step ST404 can be implemented by using, e.g., a shader which changes only the color of the part which is not completely transparent or completely opaque.

Thus, according to Embodiment 2, since the moving image control unit 103 changes the color of at least one of the shade and the gloss on the target object 201 in accordance with the transparency before synthesizing the moving image data and the area having the color whose setting is changeable (the rectangle 302), even when the number of kinds of the light source color is increased, the file size required to retain the moving image data is not increased, and an operation which arises when the kind of the light source color is newly added can be made extremely light. Further, in the case where the shader is used when the color of the shade/gloss part 202 is changed, in general, the shader is processed at high speed by a graphics processing unit (GPU), and hence an increased processing load is lighter than that in Embodiment 1.

Embodiment 3

In Embodiment 1, the rectangle 302 has one color and, as a result, the target object 201 has one color. In Embodiment 3, coloring using two or more colors is performed as described below.

The configuration of the moving image reproducing apparatus 101 is the same as that described in FIG. 1 in Embodiment 1, and hence the repeated description thereof will be omitted.

Note that, in Embodiment 1, as described with reference to FIG. 2, each of the target object 201 and the shade/gloss part 202 has a single transparency in the moving image layer 301. However, in Embodiment 3, the moving image data is extended such that each of the target object 201 and the shade/gloss part 202 has a plurality of transparencies. Herein, the single transparency denotes that one pixel has one transparency (Alpha) as in RGBA (Red, Green, Blue, Alpha), while a plurality of transparencies denote that one pixel has a plurality of transparencies as in RGBA1A2 (Red, Green, Blue, Alpha 1, Alpha 2).

In the moving image reproducing apparatus 101 according to Embodiment 3, it is assumed that, the moving image data storage unit 102 stores the moving image data in which each of the target object 201 and the shade/gloss part 202 has a plurality of transparencies by, for example, dividing the higher bit and the lower bit of the original transparency from each other for storing the plurality of transparencies.

Further, a plurality of the rectangles 302 are disposed, and the rectangles 302 are associated with respective transparencies (the detail will be described later).

An operation of the moving image reproducing apparatus 101 according to Embodiment 3 of the present invention is described below.

Figure 6:
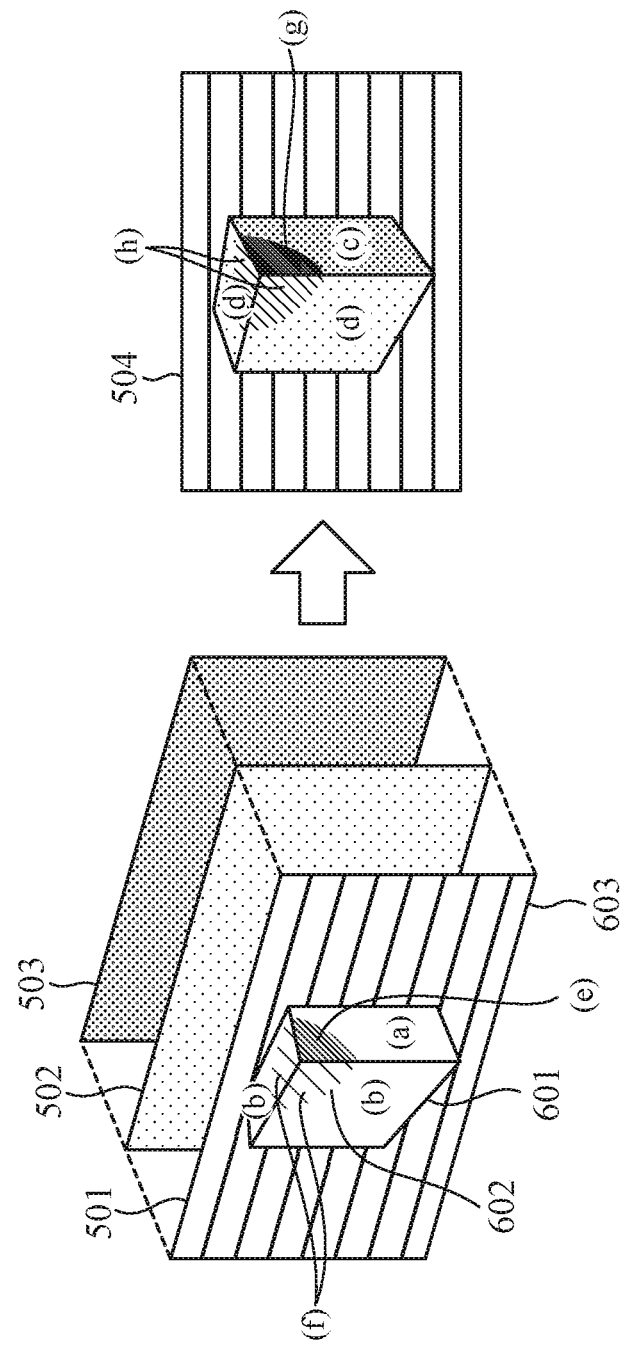
FIG. 6 is an overview diagram of the animation generation method in Embodiment 3 of the present invention.

FIG. 6 is an overview diagram of an animation generation method in Embodiment 3 of the present invention.

FIG. 7 is a flowchart of the operation of the moving image reproducing apparatus 101 according to Embodiment 3 of the present invention.

Note that Embodiment 3 will be described on the assumption that each of a target object 601 and a shade/gloss part 602 has two transparencies.

The moving image control unit 103 fetches one piece of moving image data from the moving image data storage unit 102, and disposes the moving image data as a moving image layer 501 (Step ST701).

The moving image control unit 103 further disposes rectangles 502 and 503 behind the moving image data disposed in Step ST701, in which each of the rectangles 502 and 503 has the same size as that of the moving image layer 501, and has a single color which can be changed freely by the moving image control unit 103 (Step ST702). Specifically, as shown in FIG. 6, the rectangles 502 and 503 displaying the colors are disposed for the moving image layer 501.

Note that it is assumed that, in FIG. 6, the face of the target object 601 on the right (the part (a) in FIG. 6) has the transparency corresponding to the rectangle 503, and the other faces (the part (b) in FIG. 6) have the transparency corresponding to the rectangle 502. In addition, it is assumed that, in FIG. 6, the shade/gloss part 602 on the face of the target object 601 on the right (the part (e) in FIG. 6) and the other shade/gloss part 602 (the part (f) in FIG. 6) have different transparencies corresponding to the rectangle 502 and the rectangle 503, respectively. For example, when it is assumed that the pixel of the target object is defined as RGBA1A2, A1 (0.0 to 1.0) corresponds to the rectangle 502, and A2 (0.0 to 1.0) corresponds to the rectangle 503, it is assumed that the part (a) in FIG. 6 has transparencies of A1 0.0 and A2 1.0, the part (b) in FIG. 6 has transparencies of A1 1.0 and A2 0.0, the part (e) in FIG. 6 has transparencies of A1 0.2 and A2 0.8, and the part (f) in FIG. 6 has transparencies of A1 0.3 and A2 0.2.

Herein, in FIG. 6, each of the rectangles 502 and 503 has a dot pattern for the sake of clarity, but is actually a rectangle colored in a single color without any pattern.

The moving image control unit 103 synthesizes the moving image data and the rectangles 502 and 503 and displays them on the display apparatus 104 at the time of reproduction of the moving image (Step ST703). Note that, at this time, the moving image control unit 103 synthesizes the target object 601 and the shade/gloss part 602 with the disposed rectangles 502 and 503 in accordance with their respective transparencies.

A result of synthesis of the moving image data and the rectangles 502 and 503 by the moving image control unit 103 in Step S1703 is the generation result 504 shown in FIG. 6.

Herein, it is assumed that the part (a) in FIG. 6 has transparencies of A1 0.0 and A2 1.0 and the part (b) in FIG. 6 has transparencies of A1 1.0 and A2 0.0, and hence only the color of the rectangle 503 to which A2 corresponds is reflected in the part (a) in FIG. 6, and only the color of the rectangle 502 to which A1 corresponds is reflected in the part (b) in FIG. 6. In addition, it is assumed that the part (e) in FIG. 6 has transparencies of A1 0.2 and A2 0.8 and the part (f) in FIG. 6 has transparencies of A1 0.3 and A2 0.2, and hence colors in which the color of the rectangle 502 and the color of the rectangle 503 are mixed are reflected in the part (e) and the part (f) in FIG. 6 in accordance with their respective transparencies.

Consequently, in the generation result 504, the color of the rectangle 503 is reflected only in a face of the target object 601 on the right (the part (c) in FIG. 6), and the color of the rectangle 502 is reflected in other faces (the part (d) in FIG. 6). Further, the shade/gloss part 602 of the target object 601 has an appearance in which the rectangle 503 and the rectangle 502 are synthesized in a face on the right (the part (g) in FIG. 6) and the other faces (the part (h) in FIG. 6). Note that, similarly to Embodiment 1, a background image 603 is reflected in a background part without being altered.

Thus, even in the case where the format of the moving image data is not changed, the moving image data storage unit 102 stores a plurality of transparencies by dividing the higher bit and the lower bit of the original transparency from each other or the like, and the moving image control unit 103 fetches the plurality of transparencies and synthesizes them with the appropriate rectangles 502 and 503 by shader processing or the like, whereby the target object 601 and the shade/gloss part 602 are colored in two colors.

Here, an example is explained in which each of the target object 601 and the shade/gloss part 602 has two colors and two transparencies. But the present invention is not limited thereto, and each of the target object 601 and the shade/gloss part 602 may have two or more transparencies. In addition, herein, two rectangles 502 and 503 are assumed to be disposed, but the present invention is not limited thereto, and the number of rectangles may be any number.

In addition, it is also possible to apply Embodiment 3 to Embodiment 2. That is, it is also possible for the moving image control unit 103 to dispose a plurality of rectangles 502 and 503, further change the color of the shade/gloss part 602 on the target object 601 arbitrarily in accordance with the transparency, and synthesize and display the moving image data and the rectangles 502 and 503.

Thus, according to Embodiment 3, the moving image control unit 103 disposes a plurality of areas (the rectangles 502 and 503) each having a color whose setting is changeable, and sets the color of the target object 601 in accordance with a plurality of individual transparencies. Hence it is possible to generate and reproduce a moving image adjusted to the color variation of any color from one piece of moving image data for the target object 601 displayed in the moving image data and, in addition, it is possible to color the target object 601 in a plurality of colors. Further, in the case where processing of applying a plurality of transparencies is executed by the shader, in general, the shader is processed by the graphics processing unit (GPU) at high speed, and hence the increased processing load is lighter than that in Embodiment 1.

Note that, in Embodiments 1 to 3 described above, since the part in a moving image area where the target objects 201 and 601 are displayed is not determined, it is assumed that the rectangles 302, 502, and 503 each having the same size as that of the moving image layer 301 are disposed. But the present invention is not limited thereto. The size thereof may be any size as long as the size allows coloring of the transparent part or the part which is not completely opaque of the moving image, i.e., the part which covers the target objects 201 and 601, and the shape thereof is not limited to the rectangle 302, 502, or 503, and the shape thereof may be any shape.

In addition, in Embodiments 1 to 3 described above, the moving image data storage unit 102 is configured by an HDD, a DVD, or a memory, and the moving image control unit 103 is executed by processing a program by a CPU based on software.

Note that, in the invention in the present application, it is possible to freely combine the embodiments, modify any components of the embodiments, or omit any components in the embodiments within the scope of the invention.

INDUSTRIAL APPLICABILITY

Since the moving image reproducing apparatus according to the present invention is capable of generating a moving image data adjusted to a plurality of color variations from the single piece of moving image data at the time of the reproduction for the target object displayed in the moving image data, the moving image reproducing apparatus can be applied to a moving image reproducing apparatus which reproduces moving image data adjusted to a plurality of color variations from a single piece of moving image data.

EXPLANATION OF REFERENCE NUMERALS

101: moving image reproducing apparatus
102: moving image data storage unit
103: moving image control unit
104: display apparatus
201, 601: target object
202, 602: shade/gloss part
203, 603: background image
301, 501: moving image layer
302, 502, 503: rectangle
303, 504: generation result

The invention claimed is:

1. A moving image reproducing apparatus comprising:
a moving image data storer which stores moving image data including a target object having a transparency, at least one of a shade and a gloss on the target object, and a background image; and
a moving image controller which fetches the moving image data from the moving image data storer, disposes an area having a color whose setting is changeable behind the moving image data, synthesizes the moving image data and the area, and sets the color of the area corresponding to the transparency as a color of the target object, wherein the target object has a plurality of the transparencies, and the moving image controller disposes a plurality of the areas each having the color whose setting is changeable and sets the color of the target object in accordance with each of the plurality of the transparencies.

2. The moving image reproducing apparatus according to claim 1, wherein
the moving image controller changes a color of at least one of the shade and the gloss on the target object in accordance with the transparency before synthesizing the moving image data and the area having the color whose setting is changeable.

* * * * *